United States Patent [19]

Mitchell et al.

[11] Patent Number: 4,876,484
[45] Date of Patent: Oct. 24, 1989

[54] REMOTE VIDEO INTERCONNECT AND METHOD

[75] Inventors: Roy O. Mitchell, Hillsboro; Milton D. Klaudt, Beaverton; Kathleen F. M. Ullom, West Linn, all of Oreg.

[73] Assignee: Tektronix, Inc., Beaverton, Oreg.

[21] Appl. No.: 241,812

[22] Filed: Aug. 15, 1988

Related U.S. Application Data

[63] Continuation of Ser. No. 904,076, Sep. 5, 1986, abandoned.

[51] Int. Cl.⁴ .................. H05B 41/14; H03H 7/38
[52] U.S. Cl. ......................... 315/94; 333/24 R; 333/32
[58] Field of Search .................. 315/1, 3, 3.6, 94, 102, 315/103, 104, 395; 370/6; 324/88; 333/24 R, 24 C, 32

[56] References Cited

U.S. PATENT DOCUMENTS

| | | | |
|---|---|---|---|
| 2,307,979 | 1/1943 | Whisk | 315/94 |
| 3,730,993 | 5/1973 | Moriyasu | 370/27 |
| 4,621,242 | 11/1986 | Theall, Jr. et al. | 333/32 X |

*Primary Examiner*—David Mis
*Attorney, Agent, or Firm*—William Y. Conwell; William S. Lovell; Francis I. Gray

[57] ABSTRACT

A cathode drive circuit couples a video drive signal from a cathode output amplifier to the cathode of a cathode ray tube along a first matched transmission line. Any signal energy not absorbed by the cathode is coupled along a second matched transmission line to a power dissipating load. The use of matched transmission lines avoids reflections in the system and eliminates attendant signal degradation. The power dissipating load can be located at any distance remote from both the cathode output amplifier and the cathode so as to minimize heat dissipation problems.

11 Claims, 2 Drawing Sheets

REMOTE VIDEO INTERCONNECT AND METHOD

This is a continuation of application Ser. No. 904,076, filed Sept. 5, 1986, and now abandoned.

TECHNICAL FIELD

The present invention relates to drive circuits for the cathodes of cathode ray tubes, and more particularly to a wide bandwidth drive circuit for such cathodes that allows the cathode signal source to be located remotely from the cathode without introducing distortion to the drive signals.

BACKGROUND OF THE INVENTION

Cathode ray tubes (CRTs) are increasingly being operated at higher and higher frequencies in order to obtain higher resolution video images. High resolution video images are useful in computer aided engineering (CAE) and air traffic surveillance applications, among others. The intensity of the raster scan line producing the video image is determined by the magnitude of the cathode drive signal. In high resolution applications, the circuitry driving the cathode must be able to respond quickly and accurately to transitions of this signal.

The speed at which CRT cathodes can be driven has been limited by a number of factors. Primary among these has been the poor frequency response of prior art cathode drive circuits. This poor frequency response is due in large part to the highly reactive impedance of the cathode being driven.

The impedance of a cathode ray tube cathode is essentially purely reactive. Very little of the signal energy applied to the cathode is absorbed: most of the energy is reflected back to the source. The signals reflected from the cathode back to the source return to the cathode output amplifier and are re-reflected back to the cathode. Thus, the cathode drive circuit "rings" as energy is propagated back and forth between the cathode output amplifier and the cathode, with only a small fraction of the energy being absorbed at each reflection.

The presence of these reflections in the cathode drive circuit seriously degrades the integrity of the waveforms being applied to the cathode. The signal applied to the cathode is the vector sum of the cathode amplifier output signal plus all of the reflections re-reflected back to the cathode. The superposition of these extraneous reflections onto the original cathode drive signal causes signal degradation that increases with frequency. Such signal degradation has heretofore made high frequency operation of CRT cathodes extremely difficult.

In an exemplary high resolution application, it may be necessary to produce 256 different shades of beam intensity on the screen of a CRT. The associated cathode drive circuitry must be capable of providing to the cathode a signal which can settle to one of these 256 levels in a very short period of time. The length of time available for a signal to settle to one of the 256 levels is dependent on the bandwidth of the video being applied to the cathode. The bandwidth of the video is in turn dependent on the size of the screen and the number of lines per screen. In the case of a nineteen inch, 2000 line display, a video bandwidth of 300 megahertz is required. In order to accommodate video signals having a bandwidth of 300 megahertz, the cathode drive signal must be able to switch from one of these 256 levels to the next within less than one nanosecond. Any overshoot, undershoot, or ringing caused by reflections in the cathode drive circuit must settle to the desired value within 5 nanoseconds if the integrity of the video image is to be maintained.

There are two techniques known in the art for minimizing video signal degradation caused by reflections in the drive circuit. The first technique is to locate the cathode output amplifier immediately adjacent to the neck of the CRT, next to the cathode. By minimizing the length of the conductor connecting the output amplifier to the cathode, the length of time during which reflections ring between the cathode and the output amplifier is reduced.

Positioning the cathode output amplifier immediately adjacent the neck of the cathode ray tube, however, is very undesirable from a thermal standpoint. Both the output amplifier and the neck of the CRT must dissipate substantial amounts of heat. If the CRT neck and the output amplifier are adjacent to each other, the air around each (to which heat is normally dissipated) is in part replaced by another heat producing element. This raises the operating temperature of each element with a consequent reduction in operating lifetimes and efficiencies. These thermal problems are further exacerbated in applications that use a color CRT. In such cases, there are three cathodes being driven by three separate drive circuits, with an attendant three-fold increase in heat dissipation problems.

The second prior art technique for minimizing video signal degradation caused by reflections is to insert a power dissipating resistor between the cathode output amplifier and the cathode. The resistor attenuates each signal that passes through it and thereby causes the reflections to damp to zero at an accelerated rate. Such resistance, however, also dissipates the major portion of the drive signal, decreases circuit efficiency and again exacerbates heat dissipation problems.

By combining the techniques of locating the amplifier adjacent to the neck of the CRT and coupling the amplifier to the cathode through a resistor, the operating range of cathode drive circuits can be extended to frequencies approaching 80 megahertz. As noted, however, many high resolution display applications require bandwidths far in excess of this value.

Accordingly, a need remains for an improved method and apparatus for driving the cathode of a cathode ray tube over wide bandwidths.

SUMMARY OF THE INVENTION

It is an object of the present invention to drive the cathode of a cathode ray tube at very high frequencies with a minimum of signal distortion.

It is a further object of the present invention to drive the cathode of a cathode ray tube at very high frequencies without generating additional heat near the neck of the cathode ray tube.

It is still another object of the present invention to eliminate reflections in a cathode drive circuit.

It is yet another object of the present invention to dissipate energy in a cathode drive circuit at a location remote from both the cathode ray tube and from the output amplifier.

In accordance with the present invention, a cathode drive circuit couples the drive signal from the cathode output amplifier to the cathode along a first matched transmission line. Any signal energy not absorbed by the cathode is coupled along a second matched transmission line to a power dissipating load. The use of matched transmission lines avoids reflections in the system and eliminates the attendant signal degradation. The power dissipating load can be located at any distance remote from both the cathode output amplifier and the cathode so as to minimize heat dissipation problems.

The foregoing and additional objects, features and advantages of the present invention will be more readily apparent from the following detailed description of a preferred embodiment thereof, which proceeds with reference to the accompanying drawings.

DETAILED DESCRIPTION OF PREFERRED EMBODIMENT

Figure 1:
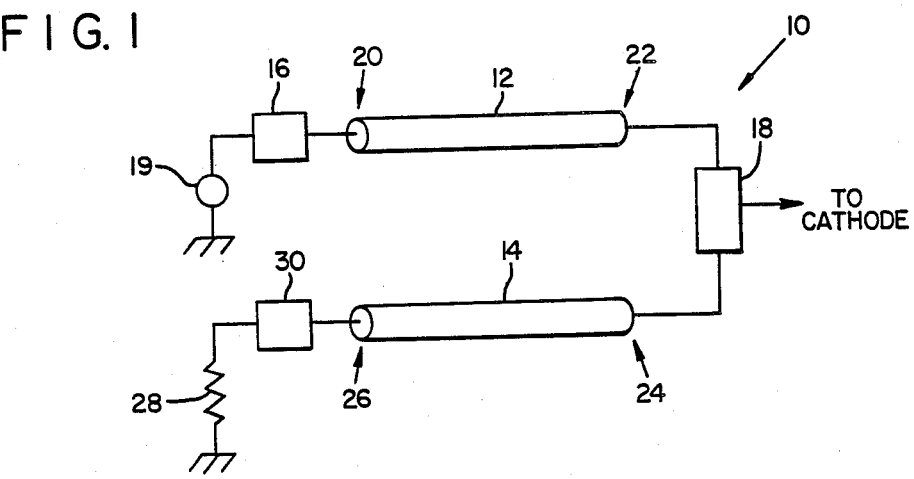
FIG. 1 is a block diagram schematic representation of the cathode drive circuit of the present invention.

With reference to FIG. 1, the cathode drive circuit 10 of the present invention includes first and second transmission lines 12, 14 and first and second impedance matching circuits 16, 18. A source 19 of wideband video signals provides signals to the input 20 of transmission line 12. First impedance matching circuit 16, interposed between source 19 and input 20, compensates for an arc protection circuit connected between the output of source 19 and RF ground which clips any transients in the video signals that exceed a predetermined threshold.

Second impedance matching circuit 18 couples together the output 22 of first transmission line 12, the cathode of the cathode ray tube (not shown) and the input 24 of the second transmission line 14. Second impedance matching circuit 18 serves a plurality of functions. It provides a signal from output 22 of transmission line 12 to the cathode of the cathode ray tube; it provides an impedance across output 22 of first transmission line 12 equal to the characteristic impedance of the first transmission line, and; it provides an impedance across input 24 of second transmission line 14 equal to the characteristic impedance of the second transmission line.

Coupled to the output end 26 of second transmission line 14 is a terminating circuit 28 for absorbing the signal energy coupled to it by the second transmission line. A third impedance matching circuit 30 can be interposed between terminating circuit 28 and output 26 of transmission line 14 if the impedance of terminating circuit 28 does not match the characteristic impedance of transmission line 14.

From the foregoing it can be seen that the cathode is not the ultimate load being driven by the cathode output amplifier 19. Instead, amplifier 19 drives terminating circuit 28. The cathode taps a small portion of this energy from the composite transmission line connecting the amplifier and the terminating circuit, but does so without introducing any discontinuities into the line. Reflections of the drive signal are thus avoided and the integrity of the video signal is maintained.

Figure 2:
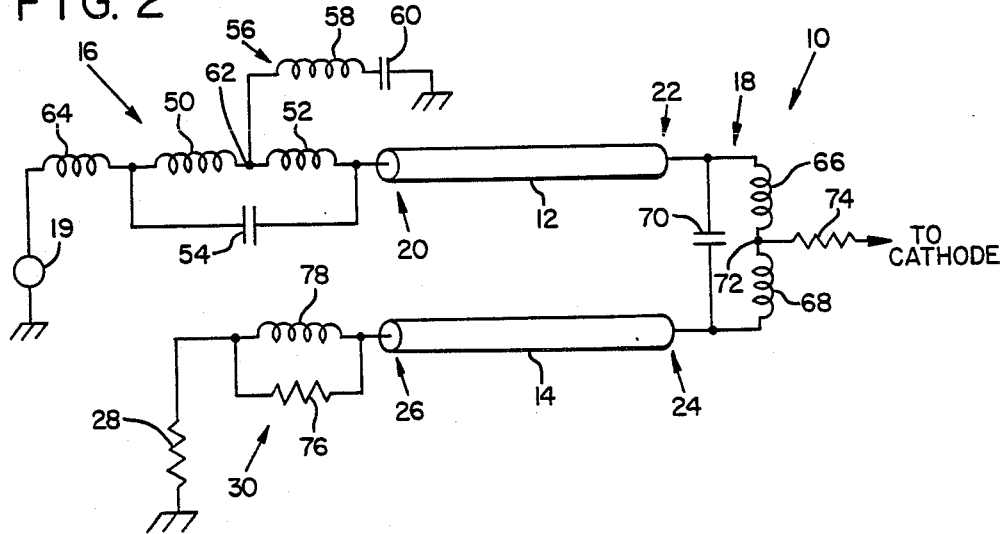
FIG. 2 is a schematic representation of the circuit of FIG. 1 showing the elements of the component matching circuits.

FIG. 2 shows the elements of the first, second and third impedance matching circuits 16, 18 and 30 used in an illustrative embodiment of the circuit shown in FIG. 1. The embodiment shown in FIG. 2 is designed for operation over a 300 megahertz bandwidth with a cathode output amplifier having an output impedance equivalent to 50,000 ohms shunted by a four picofarad capacitor. The cathode being driven in this example is modeled as a 30 nanohenry inductance in series with a 2 picofarad capacitor. The characteristic impedance of transmission lines 12 and 14 is 200 ohms. The arc protection circuit connected between the output of source 19 and RF ground is represented in FIG. 2 by its net equivalent reactance: a capacitor 60 connected to RF ground and having an effective value of 2.33 picofarads. Matching circuit 16 compensates for this reactance over the 300 megahertz bandwidth of interest and includes first and second inductive elements 50 and 52 serially coupled between signal source 19 and input 20 of first transmission line 12. A capacitive element 54 is shunted across the serially coupled inductive elements 50, 52. A reactive circuit 56 comprising an inductor 58 serially couples the junction 62 between serially coupled inductive elements 50 and 52 to the arc protection circuit. An inductor 64 can be interposed between source 19 and matching circuit 16 to serve as a peaking coil.

In the illustrated embodiment, inductors 50 and 52 have values of 30 nanohenries each. The coupling coefficient between inductors 50 and 52 is approximately 0.7. Inductor 58 has a value of 12 nanohenries and peaking coil 64 has a value of 80 nanohenries. Capacitor 54 has a value of 0.5 picofarads.

Second matching circuit 18 includes first and second inductive elements 66 and 68 serially coupled between output 22 of first transmission line 12 and input 24 of second transmission line 14. The coefficient of coupling between inductive elements 66 and 68 is approximately 0.6. A capacitive element 70 is shunted across the serially coupled inductive element 66, 68. Means are provided for coupling the junction 72 between the serially coupled inductive elements to the cathode of the cathode ray tube. In the illustrated embodiment, this coupling means is a 162 ohm resistor 74 which serves to damp the incoming cathode signal to prevent undershoot and overshoot. (The value of resistor 74 will of course depend on the characteristics of the cathode being driven.)

The terminating circuit 28 coupled to output 26 of second transmission line 14 comprises a 200 ohm resistor connected to RF ground. At high frequencies, however, the parasitic reactance of terminating circuit 28 becomes critical. In the illustrated embodiment, 200 ohm resistor 28 has an effective shunt capacitance of 2.17 picofarads. To match this reactive impedance, third matching circuit 30 is interposed between output 26 of second transmission line 14 and terminating circuit 28. Third matching circuit 30 comprises a 200 ohm resistor 76 in parallel with a 50 nanohenry coil 78. The values of these components are selected so as to provide a time constant identical to the time constant associated with terminating circuit 28.

The matching circuits 16, 18 and 30 shown in FIG. 2 are representative only. Other topologies can also advantageously be used. In some instances, matching circuits 16 and 30 can be eliminated. Matching circuit 16 can be eliminated if no arc protection circuit is included.

Matching circuit 30 can be eliminated if terminating circuit 28 has an impedance that matches the characteristic impedance of transmission line 14.

The 200 ohm impedance of the transmission lines 12, 14 shown in FIG. 2 is also not critical to the invention. This impedance was selected as a compromise between two counterveiling considerations: frequency response and power consumption. The characteristic impedance of terminating circuit 28, and consequently the characteristic impedance of transmission lines 12, 14, should be as low as possible in order to minimize the circuit's time constants and extend the circuit's frequency response. However, as the impedance of transmission lines 12, 14 and terminating load 28 is decreased, the power consumed by the circuit is increased. The transmission line impedance of 200 ohms was selected as a compromise between these counterveiling considerations, but is not otherwise critical to operation of the circuit.

Similarly, although the characteristic impedance of transmission lines 12 and 14 in the illustrated embodiment are equal, this need not be the case. In alternative embodiments the circuit can be designed with transmission lines having different characteristic impedances.

In still other embodiments of the invention, the terminating load 28 can be omitted as a discrete component. Instead, second transmission line 14 can be made lossy and extended for sufficient distance so that all energy provided to line 14 is dissipated in the line itself.

Figure 3:
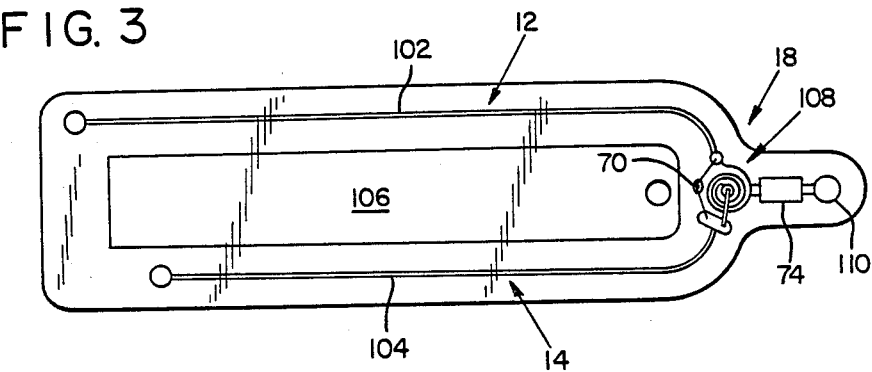
FIG. 3 is a plan view of a portion of a cathode drive circuit according to the present invention showing the first and second transmission lines and the second matching circuit as constructed on a flexible substrate.
Figure 4:
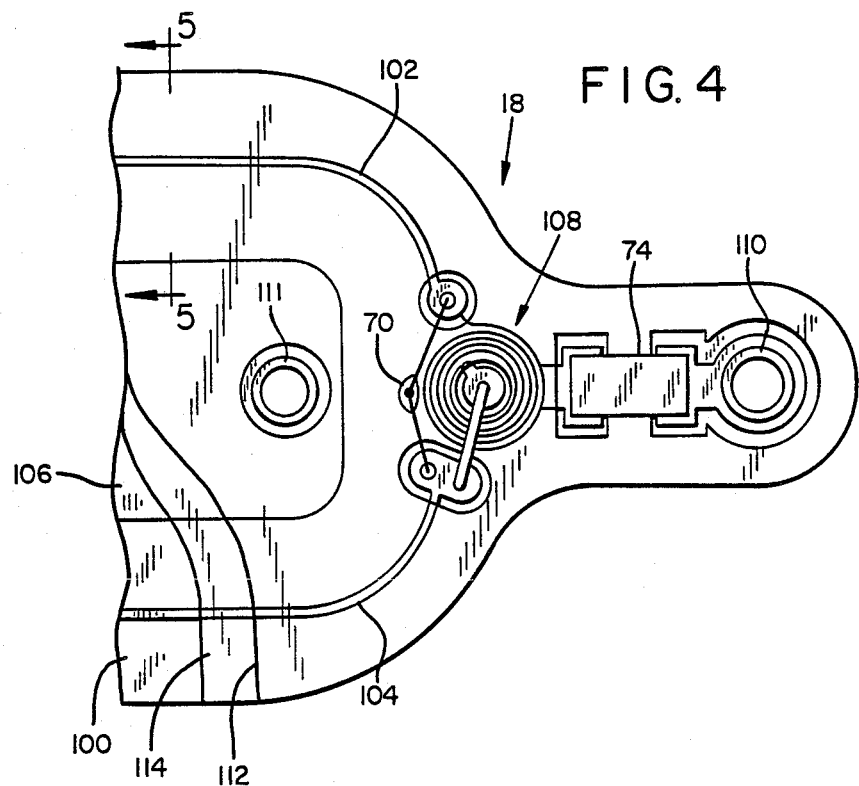
FIG. 4 is an enlarged segment view of the circuit of FIG. 3 showing the layered construction and the second matching circuit.
Figure 5:
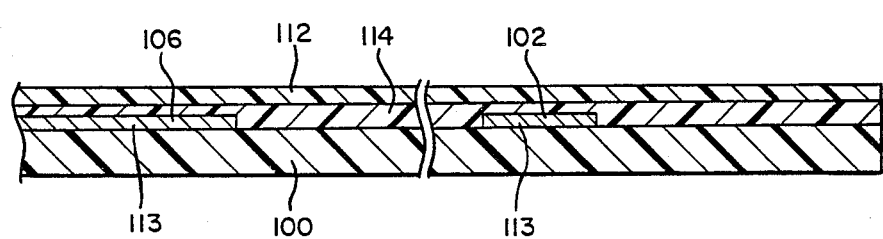
FIG. 5 is an enlarged section view taken on line 5—5 of FIG. 4.

In the preferred embodiment of the present invention, first and second transmission lines 12 and 14 and second matching circuit 18 are all fabricated on a flexible substrate 100. Such construction is illustrated in FIGS. 3, 4 and 5. Transmission lines 12 and 14 comprise first and second metal traces 102, 104 on flexible substrate 100 which are operated against a ground plane 106 intermediate the two traces. The width of conductor traces 102, 104 and the spacing of these traces from ground plane 106 are chosen to yield a transmission line impedance of 200 ohms. In the illustrated embodiment, traces 102 and 104 have a width of 12 mils and are spaced 105 mils from the edge of ground plane 106.

Also constructed on flexible substrate 100 is second matching circuit 18, shown in enlarged detail in FIG. 4. Matching circuit 18 comprises a tapped spiral inductor 108 shunted by capacitor 70. Spiral inductor 108 is tapped along its length to yield the two component inductances 66 and 68 shown in FIG. 2. A chip resistor 74 couples matching circuit 18 to a grommet 110 to which the cathode is connected. A similar grommet 111 is provided to allow connections to ground plane 106.

Fabrication of the circuitry shown in FIGS. 3 and 4 is described with reference to FIG. 5. Flexible substrate 100 comprises a 5 mil thick sheet of polyimide to which is bonded a 1.4 mil thick sheet of rolled annealed copper 113. The transmission lines, ground plane and spiral inductor for matching circuit 18 are then etched into copper sheet 113 using conventional photolithographic techniques. A cover sheet 112 of polyimide 2 mils thick is then bonded to cover the circuitry using an acrylic or epoxy adhesive 114. The acrylic adhesive is approximately 0.5 to 1 mil thick.

Acrylic adhesive 114 and top cover sheet 112 do not cover the entire flexible assembly. Instead, these layers are formed so as to leave uncovered the areas of copper 113 that are to be connected to components and external circuitry. These uncovered areas are shown in FIG. 4 surrounding grommets 110, 111 and the pads to which elements of matching circuit 18 are connected.

The lengths of transmission lines 12 and 14 are not critical. Because there are no reflections in the system, they can be made any length. Thus, the cathode output amplifier and the power dissipating load can both be located at any distance remote from the CRT. In the illustrated embodiment the transmission lines are approximately 2 inches long.

The present invention is well adapted to construction in hybrid form. In the preferred embodiment, a first hybrid circuit includes cathode output amplifier 19 and associated matching network 16. A second hybrid circuit includes a thick film terminating resistor 28 and associated matching circuitry 30. These hybrids are connected to first end 20 of transmission line 12 and second end 26 of transmission line 14, respectively.

To maximize the circuit's usable bandwidth, the inductance of the ground return paths between the cathode and the hybrid circuit elements must be minimized. In the preferred embodiment, the inductance of the return path is kept below 0.5 nanohenries by connecting the grounded points of all circuit elements together with a common ground plane.

Construction in the illustrated form, using the photolithographed flexible circuit approach, greatly extends the upper frequency limit of the circuit. Although the circuit could be constructed using discrete coaxial cables or other forms of transmission line, it would be virtually impossible to maintain the circuit tolerances needed for high frequency operation.

Since the present invention eliminates reflections as a limitation to cathode drive circuit bandwidth, the only remaining limitations are the frequency responses of the individual circuit components. In the illustrated embodiment, the operating bandwidth is limited principally by the distributed interspiral capacitance of spiral inductor 108. However, other circuit topologies and techniques, such as stripline matching networks, can be employed to extend the operating bandwidth to virtually any desired value.

Having described and illustrated the principles of our invention in a preferred embodiment and a few variations thereof, it should be apparent to those skilled in the art that the invention can be modified in arrangement and detail without departing from such principles. Accordingly, we claim all modifications coming within the scope and spirit of the following claims.

We claim:

1. A cathode drive circuit for driving a cathode of a cathode ray tube from a signal source over a wide range of frequencies comprising:
   a first transmission line having an input, an output and a characteristic impedance;
   a second transmission line spaced apart from the first transmission line, the second transmission line having an input, an output and a characteristic impedance;
   terminating means for terminating the output of the second transmission line with a load matching the characteristic impedance of said second transmission line;
   impedance matching means coupling the output of the first transmission line, the cathode of the cathode ray tube and the input of the second transmission line, for:
   providing a signal from the output of the first transmission line to the cathode;

providing across the output of the first transmission line an impedance equal to the characteristic impedance of said first transmission line; and providing across the input of the second transmission line an impedance equal to the characteristic impedance of said second transmission line;

whereby reflections within the cathode drive circuit are substantially avoided.

2. The circuit of claim 1 in which the characteristic impedance of the first transmission line is equal to the characteristic impedance of the second transmission line.

3. The cathode drive circuit of claim 1 in which the terminating means comprises:

resistor means for dissipating energy; and means for matching the impedance of the resistor means to the characteristic impedance of the second transmission line.

4. The cathode drive circuit of claim 3 in which the resistor means is physically spaced apart from the cathode.

5. The cathode drive circuit of claim 1 in which the first and second transmission lines comprise first and second conductors operated in conjunction with a common ground conductor.

6. The cathode drive circuit of claim 5 in which the first and second transmission lines are flexible.

7. The cathode drive circuit of claim 1 which further includes compensating means for compensating for a reactance presented by an arc prevention circuit across the output of the signal source, said compensating means comprising:

first and second inductive elements serially coupled between the signal source and the input of the first transmission line;

a capacitive element shunted across said serially coupled inductive elements; and reactive means for coupling the junction between said serially coupled inductive elements to the arc prevention circuit.

8. The cathode drive circuit of claim 1 in which the impedance matching means comprises:

first and second inductive elements serially coupled between the output of the first transmission line and the input of the second transmission line;

a capacitive element shunted across said serially coupled inductive elements; and means for coupling the junction between said serially coupled inductive elements to the cathode.

9. A cathode drive circuit for driving a cathode of a cathode ray tube from a signal source over a wide range of frequencies comprising:

a power dissipating load;

first and second transmission lines spaced apart from each other, each having respective characteristic impedances, an input and an output;

said first transmission line having its input coupled to the signal source and having its output coupled to both the cathode and to the input of the second transmission line;

said second transmission line having its input coupled to both the cathode and to the output of the first transmission line, and having its output coupled to the power dissipating load;

means for transforming the impedance of the cathode and the input of the second transmission line at the output of the first transmission line to the impedance of the first transmission line; and means for transforming the impedance of the power dissipating load at the output of the second transmission line to the impedance of the second transmission line;

whereby reflections within the cathode drive circuit are substantially avoided.

10. A method of driving the cathode of a cathode ray tube from a signal source over a wide frequency bandwidth, comprising the steps of:

coupling the signal source to the cathode through a first transmission line;

coupling the cathode to a power absorbing load through a second transmission line separate from the first transmission line;

matching the impedance of the cathode and the second transmission line to the characteristic impedance of the first transmission line;

matching the impedance of the power absorbing load to the characteristic impedance of the second transmission line, whereby signal energy is not reflected from the cathode back to the signal source.

11. A method of driving the cathode of a cathode ray tube from a signal source comprising the steps of:

coupling a signal from the signal source to a circuit node along a first matched transmission line;

coupling a portion of the signal from the circuit node to a power dissipating load along a second matched transmission line separate from the first matched transmission line; and coupling a portion of the signal from the circuit node to the cathode.

* * * * *